United States Patent Office 3,371,151
Patented Feb. 27, 1968

3,371,151
ELECTRICAL BUS STRUCTURE
Thompson K. Bonzo, Pittsburgh, Pa., and Gordon F. Sauers, deceased, late of Pittsburgh, Pa., by Genevieve J. Sauers, administratrix, Pittsburgh, Pa., assignors to Westinghouse Electric Corporation, Pittsburgh, Pa., a corporation of Pennsylvania
Filed Feb. 18, 1966, Ser. No. 528,657
6 Claims. (Cl. 174—71)

This invention relates to electrical bus structures and more particularly to means for making connections to tubular conductors in such bus structures.

In certain types of electrical bus structures, it is desirable that tubular conductors be employed in order to obtain certain advantages with respect to structural strength, current carrying capacity for a given cross-sectional area, prevention of corona discharge, and ease of providing electrical insulation on the conductor. In employing tubular conductors in such bus structures, a problem arises in providing suitable joint structures between successive conductor sections and tap connections to such tubular conductors. In the past, joint structures and tap connections for tubular conductors have involved either cumbersome clamping members or the flattening of certain portions of the tubular conductors included in a particular bus structure. It is therefore desirable to provide an improved bus structure including means for joining successive tubular conductor sections and for making tap connections to such conductors.

It is an object of this invention to provide a new and improved means for making connections to tubular conductors in bus structures.

Another object of this invention is to provide an improved means for joining successive tubular conductor sections in an electrical bus structure.

Other objects of the invention will, in part, be obvious and will, in part, appear hereinafter.

Figure 1:
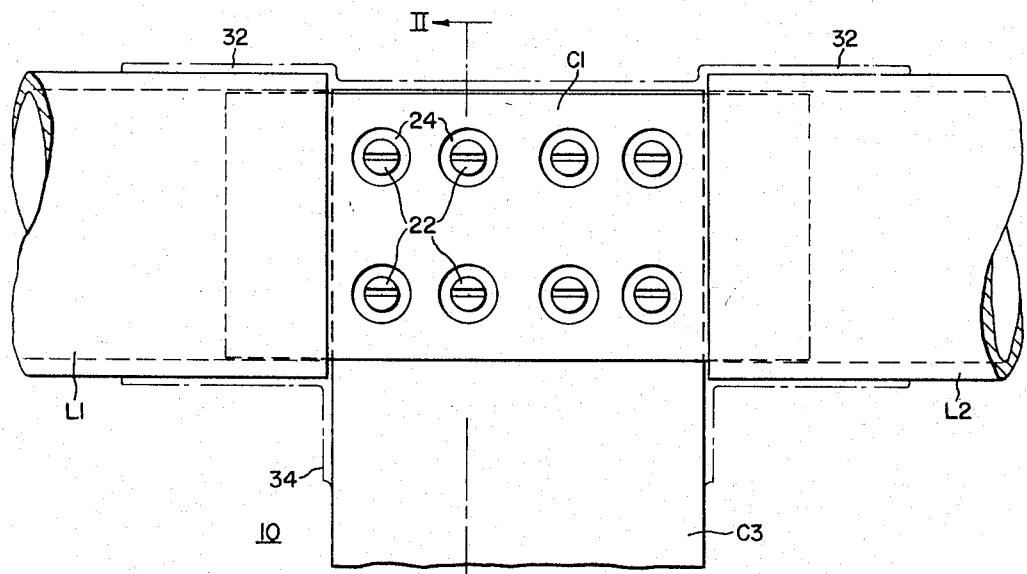
Figure 2:
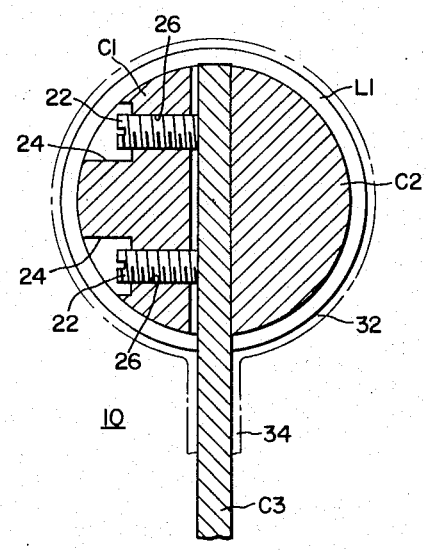

For a fuller understanding of the nature and objects of the invention, reference should be had to the following detailed description taken in conjunction with the accompanying drawing, in which:

FIGURE 1 is a side elevational view of a portion of an electrical bus structure embodying the principal features of the invention; and FIG. 2 is a view, partly in end elevation and partly in section taken along the line II—II in FIG. 1, of the bus structure shown in FIG. 1.

Referring now to the drawing in FIG. 1 in particular, there is illustrated an electrical bus structure 10 which includes a plurality of generally tubular or hollow cylindrical electrical conductors L1 and L2 which are disposed in end to end relationship and generally axially aligned with one another. As shown in FIG. 2, the tubular conductors L1 and L2 are illustrated as being generally circular in cross-section with the adjacent ends of the tubular conductors L1 and L2 being axially spaced from one another, and may be formed from a suitable electrically conducting material, such as copper or aluminum. The tubular bus conductors L1 and L2 taken together may form part of one phase of a three-phase bus structure in which the other phases would be laterally spaced from the tubular conductors L1 and L2. In a typical application, the tubular bus conductors L1 and L2 would normally be maintained at a relatively high potential and disposed in an enclosing housing (not shown) with the bus conductors L1 and L2 being supported and positioned within the associated housing by suitable electrical insulating means (not shown), such as insulators or bushings.

In order to electrically connect the spaced ends of the tubular conductors L1 and L2 and to permit a transversely projecting tap connection to be made to the conductors L1 and L2 when interconnected, the bus structure 10 includes a pair of laterally spaced, generally cylindrical, electrically conducting members or sectors C1 and C2 which extend axially between the spaced ends of the conductors L1 and L2 and whose opposite ends project into the respective ends of the conductors L1 and L2 as best shown in FIG. 1. As illustrated, the conducting members C1 and C2 are generally semicircular in cross-section with the opposite ends of each of the conducting members C1 and C2 being disposed in generally nested relationship with or inside the associated tubular conductors L1 and L2. It is to be noted that the outer periphery of each of the conducting members C1 and C2 is generally complementary with the inner periphery of the associated tubular conductors L1 and L2 as shown in FIG. 2 with a portion of each of the conducting members C1 and C2 adjacent to the space between said conducting members being substantially flat.

In order to provide a tap or T connection from the tubular conductors L1 and L2 at the joint formed between the tubular conductors L1 and L2 by the conducting members C1 and C2, the transversely extending conducting member C3 is disposed transversely with respect to a line extending between the ends of the tubular conductors L1 and L2 with at least a portion of the conducting member C3 being disposed between the conducting members C1 and C2, as best shown in FIG. 2. As illustrated, the electrically conducting member or substantially flat, electrical connector C3 is substantially rectangular in cross-section with at least a portion of the conducting member C3 projecting transversely with respect to a line extending between the ends of the tubular conductors L1 and L2 beyond the outer periphery of each of the tubular conductors L1 and L2 as projected on a plane which is transverse to a line extending between the adjacent ends of the tubular conductors L1 and L2. It should be understood that in certain applications, the conducting member C3 may project transversely in the opposite direction from the direction shown in FIG. 2 or may project in both directions to form a crossover connection to the tubular conductors L1 and L2 or that the conducting member C3 may project transversely in any direction around the periphery of the conductors L1 and L2.

In order to actuate or force the opposite ends of each of the conducting members C1 and C2 into contact making engagement with the inner periphery of the respective ends of the tubular conductors L1 and L2 and to actuate or force the conducting member C3 into contact making engagement with at least one of the conducting members C1 or C2, the conducting member C1 is provided with a plurality of spaced, threaded openings 26 which may be enlarged adjacent to the outer periphery of the conducting member C1, as indicated at 24. As best shown in FIG. 2, a threaded member or screw is disposed to pass through and engage each of the threaded openings 26 in the conducting member C1 with the inner end of each of the threaded members 22 bearing against the substantially flat surface on one side of the conducting member C3. When the threaded members or screws 22 are actuated inwardly against the conducting member C3, the conducting member C3 is forced against the substantially flat surface provided on the conducting member C2 and the opposite ends of both of the conducting members C1 and C2 are forced into good contact making engagement with the inner periphery of the respective ends of the tubular conductors L1 and L2. The threaded members or screws 22 also serve to retain the various portions of the bus structure 10 as illustrated in assembled relationship.

It is to be noted that suitable tubular electrical insulating material may be provided on the tubular conductors L1 and L2 and over the connecting members C1 and C2.

Suitable electrical insulation may also be provided on the tap connecting member C3, as indicated at 34 in FIGS. 1 and 2.

It is important to note that neither of the connecting conductors C1 and C2 projects beyond the outer periphery of the tubular conductors L1 and L2 as projected on a plane which is transverse to a line extending between the adjacent ends of the tubular conductors L1 and L2 to thereby maintain the electrical insulating clearances between the connecting members C1 and C2 and any adjacent housing or parts which may be maintained at ground potential.

It is to be understood that in a particular application the tubular conductors in a bus structure as disclosed may be generally rectangular in configuration rather than generally circular as illustrated with the conducting members C1 and C2 being suitably modified to be also generally rectangular in configuration. It is also to be understood that in a particular application, the diameters or the wall thicknesses of the interconnected tubular conductors need not be exactly the same since the opposite ends of the conducting members C1 and C2 may be modified to be of a different size or shape, as required in a particular application. It is to be further understood that in a particular application, the ends of the contacting members C1 and C2 which are disposed inside the respective ends of the associated tubular conductors L1 and L2 may be serrated or roughened to increase the effective conductivity of the joint structure as disclosed.

The apparatus embodying the teachings of this inveniton has several advantages. For example, neither of the interconnected tubular conductors L1 and L2 or the tap connecting member C3 need be drilled or cut or flattened. In addition, only one of the conducting members C1 or C2 need be provided with threaded openings as disclosed. Finally, the electrical insulating clearances between the bus conductors L1 and L2 are maintained through the joint structure or tap connection as disclosed except in the single direction in which the tap connecting member C3 projects. As mentioned previously, the bus structure as disclosed also readily lends itself to use of tubular electrical insulating material. The joint structure or connecting means as disclosed also readily lends itself to convenient assembly or disassembly as required for manufacturing or maintenance purposes.

Since numerous changes may be made in the above described apparatus and different embodiments of the invention may be made without departing from the spirit and scope thereof, it is intended that all the matter contained in the foregoing description or shown in the accompanying drawing shall be interpreted as illustrative and not in a limiting sense.

What is claimed is:

1. A bus structure comprising first and second tubular, electrical conductors having adjacent ends generally aligned with each other and spaced axially from one another, first and second generally cylindrical, electrically conducting members having the opposite ends disposed between and extending into the adjacent ends of the first and second conductors and being laterally spaced from one another, a substantially flat conductor disposed between the first and second conducting members and projecting in at least one direction transversely with respect to a line extending between the ends of the first and second conductors beyond the outer periphery of each of the latter conductors, and one or more threaded members each passing through and engaging a corresponding threaded opening in only one of the conducting members transversely with respect to a line extending between the ends of the first and second conductors to bear against the flat conductor to actuate the substantially flat conductor into engagement with one of the conducting members and to actuate the conducting members into engagement with the ends of the first and second conductors.

2. The combination as claimed in claim 1, wherein each of the tubular conductors is generally circular in cross-section and each of the first and second electrically conducting members is generally semicircular in cross-section.

3. The combination as claimed in claim 1, wherein each of the tubular conductors is generally rectangular in cross-section and each of the electrically conducting members is generally rectangular in cross-section.

4. A bus structure comprising a pair of generally cylindrical, tubular electrical conductors disposed in end-to-end relationship and axially spaced from one another, a pair of laterally spaced electrically conducting members bridging the space between the adjacent ends of the pair of conductors and extending into the respective ends of the pair of conductors, the cross-section of the portion of each of the conducting members between the respective ends of the pair of conductors falling within the cross-section of each of the pair of tubular electrical conductors projected on a plane which is transverse to a line extending between the adjacent ends of the pair of tubular electrical conductors, an additional conductor having a generally rectangular cross-section disposed between the pair of conducting members and projecting in at least one direction which is substantially transverse to a line extending between the ends of the pair of tubular conductors beyond the outer periphery of each of the tubular conductors, and one or more screws each passing through and engaging a corresponding threaded opening in only one of the conducting members to bear against the additional conductor to actuate the additional conductor into engagement with the other conducting member and to actuate the pair of conducting members into engagement with the respective ends of the tubular conductor.

5. The combination as claimed in claim 4 wherein each of the tubular conductors is generally circular in cross-section and each of the conducting members is generally semicircular in cross-section.

6. The combination as claimed in claim 4 wherein each of the tubular conductors and each of the conducting members is generally rectangular in cross-section.

No references cited.

DARRELL L. CLAY, *Primary Examiner.*